(12) United States Patent
Yee

(10) Patent No.: US 7,394,990 B1
(45) Date of Patent: Jul. 1, 2008

(54) ALL OPTICAL WAVELENGTH CONVERTER

(75) Inventor: Ting K. Yee, Foster City, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 645 days.

(21) Appl. No.: 11/137,471

(22) Filed: May 26, 2005

(51) Int. Cl.
  *H04B 10/16* (2006.01)
  *G02F 1/35* (2006.01)
  *G02F 2/02* (2006.01)
(52) U.S. Cl. ........................................ 398/180; 359/326
(58) Field of Classification Search ................. 398/175, 398/180; 359/326, 332
  See application file for complete search history.

(56) References Cited

U.S. PATENT DOCUMENTS 7,092,145 B2 * 8/2006 Takagi ........................ 359/326

* cited by examiner

*Primary Examiner*—Shi K Li
(74) *Attorney, Agent, or Firm*—McDermott Will & Emery LLP

(57) ABSTRACT

An optical wavelength converter receives an input optical signal, and in response, generates an output optical signal having a wavelength that is different from the wavelength of the received input signal. An optical amplifier amplifies the received input signal and delivers the amplified signal to an optical splitter adapted to split the amplified signal into two identical optical signals. An optical multiplexer receives one of the split signals as well as a continuous wave optical signal to generate a combined signal. An semiconductor optical amplifier receives the combined signal at its first side, and the other one of the split signals at its second side. The output signal is generated as a result of a counter-propagating four-wave mixing occurring within the semiconductor optical amplifier. This output signal has the same wavelength as the continuous-wave signal and has an amplitude modulation that is identical to the amplitude modulation of the input signal.

19 Claims, 3 Drawing Sheets

ALL OPTICAL WAVELENGTH CONVERTER

STATEMENT AS TO RIGHTS TO INVENTIONS MADE UNDER FEDERALLY SPONSORED RESEARCH OR DEVELOPMENT

Not applicable.

CROSS-REFERENCED APPLICATIONS

Not applicable.

FIELD OF THE INVENTION

The present invention relates to optical communication systems and, more particularly to wavelength division multiplexed optical communication systems in which wavelengths of optical signals are converted via only optical components.

BACKGROUND OF THE INVENTION

Demand for high performance communication networks capable of transporting multiple types of data, such as text, audio and video data, is on the rise. To carry greater amount of data over existing communication channels, such as fiber-optic communication channels, network carriers are increasingly using high bandwidth technologies, such as wavelength division multiplexing (WDM) and optical carrier (OC) level 192. Such communication networks rely upon high performance packet switches, such as asynchronous transfer mode (ATM) switches, frame relay switches and internet protocol (IP) routers which route the incoming packets to their desired destinations. Fiber-optic communication systems provide a number of advantages over conventional copper-based systems. Among such advantages are the ability to carry higher volume of information at greater speeds, and a reduced need for signal amplification when transferring signals over long distances To utilize the high bandwidth capability of existing fiber optic communication channels, data is typically transmitted through many such channels through multiplexing. Two multiplexing methods exist, namely time division multiplexing (TDM) and frequency division multiplexing (FDM).

In accordance with the TDM technique, data bits associated with different channels are interleaved in the time domain to form a composite bit stream. For example, assume that each time slot is about 15 us for a single voice channel operating at 64 Kb/sec. Accordingly, five such channels may be multiplexed via the TDM technique if the bit streams of successive channels are delayed by 3 usec. Most telecommunication networks implement TDM for transfer of digital signals. A commonly known standard, referred to as synchronous optical network (SONET), defines a synchronous frame structure for transmitting signals using TDM.

In accordance with the FDM technique, the channels are positioned along the frequency domain with the carrier frequencies being spaced apart more than the channel bandwidth so as to inhibit channel spectra overlap. When FDM is implemented in optical domain, it is often referred to as WDM. A WDM system typically uses a number of optical channels each having an assigned channel wavelength. The optical signals in each channel are multiplexed to form a composite optical signal. The composite optical signal is transmitted and subsequently demultiplexed such that the received optical signal associated with each wavelength is routed to its destination.

In many applications, such as optical LANs, there is a need to route the optical signals associated with one or more optical channels to different destinations. One known technique for optical routing is commonly referred to as add/drop multiplexing. To perform add/drop multiplexing, the wavelength of the optical signal added to the network may need to be converted to a different value.

One conventional technique developed for converting the wavelength of an optical signal is to convert the optical signal to an electrical signal and then generate an optical signal with a different wavelength from the electrical signal. FIG. 1 is a simplified block diagram of a conventional optical-electrical wavelength converter 10, as known in the prior art. Wavelength converter 10 is shown as including an optical-to-electrical signal converter 12, an electrical control system 14, and an electrical-to-optical converter 16. Optical-to-electrical signal converter 12 is adapted to receive an optical signal having wavelength $\lambda_1$ and convert it to an electrical signal $E_1$. Electrical control system 14 receives electrical signal $E_1$, and in response generates electrical signal $E_2$. Electrical-to-optical signal converter 16 receives signal $E_2$, and in response, generates an optical signal having wavelength $\lambda_2$. Optical-to-electrical signal converter 12, electrical control system 14 and electrical-to-optical signal converter 16 are often required to operate at relatively high speeds, and thus are expensive and consume relatively high power.

To overcome some of the shortcomings of optical-electrical wavelength converters, all optical wavelength converters have been developed. FIG. 2 is a simplified block diagram of an all-optical wavelength converter 20 adapted to convert an incoming amplitude modulated optical signal at the wavelength $\lambda_1$, to an optical signal at the wavelength $\lambda_2$ with the same amplitude modulation, as known in the prior art. Optical wavelength converter 20 includes an integrated optical chip containing semiconductor optical amplifiers and a Michelson interferometer (SOA-MI) 22, an optical source 26 and an optical circulator 24. SOA-MI 22 receives amplitude modulated optical signal A having wavelength $\lambda_1$ and a continuous-wave (CW) optical signal B at wavelength $\lambda_2$, which is generated by CW laser 26, and which has wavelength $\lambda_2$ through an optical circulator 24. As known to those skilled in the art, semiconductor optical amplifier and a Michelson interferometer 22 causes the occurrence of cross-phase modulation of the optical signal at wavelength $\lambda_2$ due to the strong optical signal at wavelength $\lambda_1$. In response, SOA-MI 22 generates optical signal C that has the same wavelength $\lambda_2$ as signal B but whose amplitude follows the amplitude of signal A. The optical signal C comes out from 22 at the same port as the optical signal B goes in 22. The optical circulator 24 channels the optical signal C to the output.

The main purposes to convert wavelengths all in optical domain are to reduce power consumption and complexity to save cost. Prior art all-optical wavelength converters, such as that shown in FIG. 2, cannot achieve these goals. One of the figures of merit of a wavelength converter is the extinction ratio, which is directly related to the signal to noise ratio of a signal. In order to minimize the degradation of the signal to noise ratio, it is necessary to make the extinction ratio as large as possible. Unfortunately, Michelson interferometer is known to produce signals with poor extinction ratio due to fabrication tolerances and environmental effects. Therefore, in order to achieve extinction ratios good enough for telecommunication applications, active bias control is necessary. This bias controller contains high speed photonics and electronics that can detect and analyze the data carried by the output optical signal at the output of the optical wavelength converter. Such bias controllers are expensive and have large power consumption defeating the main purposes of low cost and low power consumption. Thus, a need continues to exist for an all optical wavelength converter that is low cost and more efficient.

BRIEF SUMMARY OF THE INVENTION

In accordance with the present invention, an optical wavelength converter receives an input optical signal, and in response, generates an output optical signal having a wavelength that is different from the wavelength of the received input optical signal. In some embodiments, the optical wavelength converter includes, in part, an optical amplifier, an optical splitter, an optical multiplexer, a semiconductor optical amplifier, and an optical circulator.

In one embodiment, the optical amplifier receives and amplifies the input optical signal at wavelength $\lambda_1$. The amplified signal has the same wavelength as the received input signal. In some embodiments, the optical amplifier may be a semiconductor optical amplifier. In other embodiments, the optical amplifier may be an Erbium-doped fiber amplifier.

The amplified optical signal is subsequently applied to the optical splitter, which is adapted to split the amplified optical signal into two identical optical signals, i.e., two optical signals that are replicas of one another in waveform but not necessary in power. The optical multiplexer receives a first one of the split optical signals. The optical multiplexer also receives a continuous-wave optical signal, which is generated by a laser at wavelength $\lambda_2$, via an optical circulator, and in response generates a combined optical signal. The wavelength of the output optical signal generated by the optical wavelength converter is the same as the wavelength of the continuous-wave optical signal. In some embodiments, the optical multiplexer may be an optical combiner.

The optical nonlinear medium receives the combined signal generated by the optical multiplexer at its first side, and receives the second one of the split signals at its second side. Due to the nonlinear effect produced by the two strong counter-propagating optical signals at $\lambda_1$, the optical nonlinear medium generates and delivers an output optical signal to the optical multiplexer. This signal has the same wavelength as the continuous-wave signal and has an amplitude modulation that is the same as the amplitude modulation of the optical signal received by the optical amplifier. In some embodiments, the optical nonlinear medium may be a semiconductor optical amplifier or an Erbium-doped fiber amplifier. In other embodiments, the optical nonlinear medium may be just a long fiber.

DETAILED DESCRIPTION OF THE INVENTION

Figure 1:
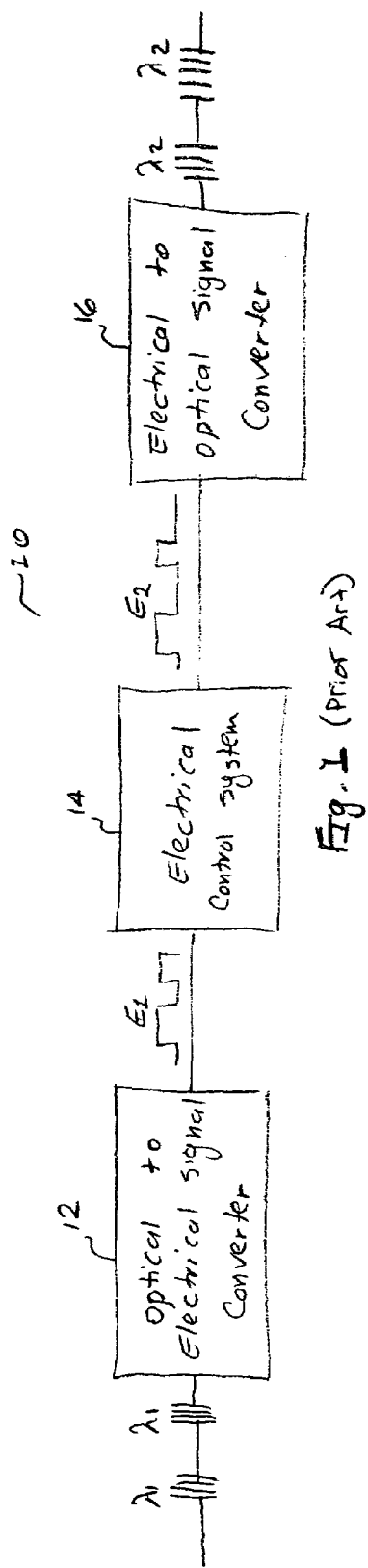
FIG. 1 is a simplified block diagram of a conventional optical-electrical wavelength converter, as known in the prior art.
Figure 2:
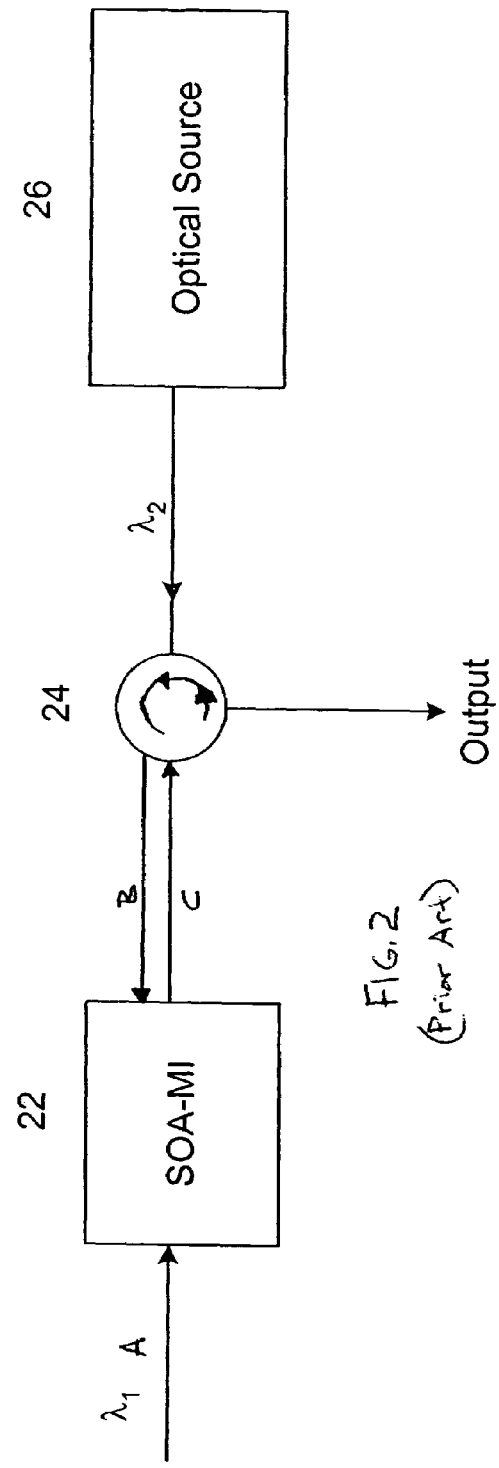
FIG. 2 is a simplified block diagram of an all-optical wavelength converter, as known in the prior art.
Figure 3:
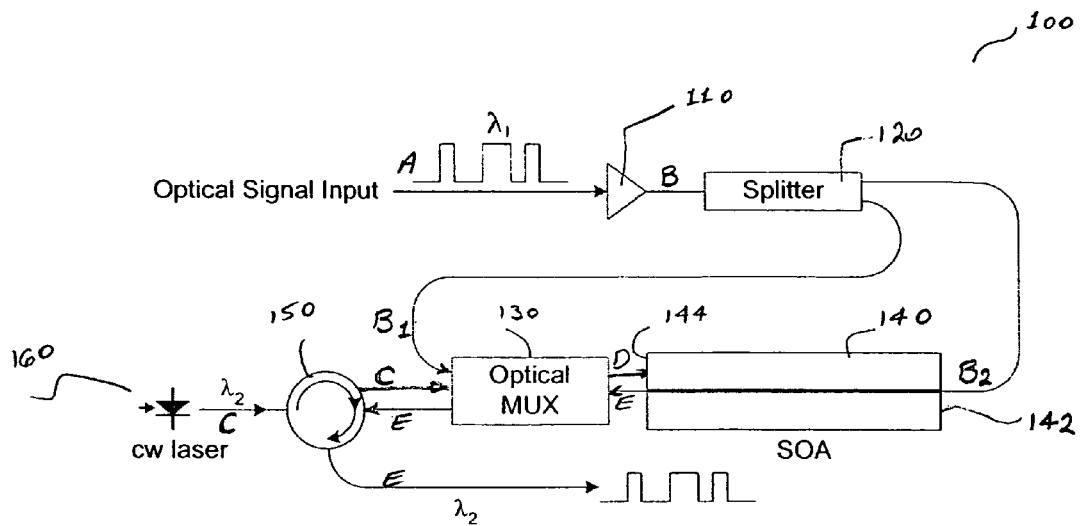
FIG. 3 is a simplified block diagram of an all-optical wavelength converter, in accordance with one embodiment of the present invention.

In accordance with the present invention, an optical wavelength converter receives an input optical signal, and in response, generates an output optical signal having a wavelength that is different from the wavelength of the received input signal and an amplitude modulation that is the same as the amplitude modulation of the received input signal. FIG. 3 is a simplified block diagram of an optical wavelength converter 100, in accordance with one embodiment of the present invention. Optical wavelength converter 100 includes, in part, an optical amplifier 110, an optical splitter 120, an optical multiplexer 130, a semiconductor optical amplifier 140, and an optical circulator 150. Optical wavelength converter 100 receives input optical signal A having a wavelength $\lambda_1$, and in response, generates optical signal E having wavelength $\lambda_2$ and amplitude modulation same as the amplitude modulation of optical signal A, as described in detail below.

As seen from FIG. 3, optical amplifier 110 receives and amplifies optical signal A having wavelength $\lambda_1$, and in response, generates optical signal B whose wavelength is also equal to $\lambda_1$. In some embodiments, optical amplifier 110, may be a semiconductor optical amplifier. In other embodiments, optical amplifier 110 may be an Erbium-doped fiber amplifier, commonly known as EDFA.

The amplified optical signal B is applied to optical splitter 120. Optical splitter 120 splits the amplified optical signal B into two optical signals with identical amplitude modulation, namely optical signals $B_1$ and $B_2$, each of which amplitude modulation is identical to (i.e., is a replica of) optical signal B and has the wavelength of $\lambda_1$. Signal $B_1$ is applied to multiplexer 130, which is also adapted to receive signal C supplied by optical circulator 150. Signal C is provided to optical circulator 150 from continuous-wave laser source 160 and has the wavelength of $\lambda_2$. Optical multiplexer 130 combines optical signal $B_1$ and optical signal C and generates combined signal D. In some embodiments, optical multiplexer 130 is an optical combiner.

Signal D generated by optical multiplexer 130 is applied to side 144 of semiconductor optical amplifier 140. Signal $B_2$ that is generated by optical splitter 120, and that is a replica of signals $B_1$ and B, is applied to side 142 of semiconductor optical amplifier 140. As is seen from FIG. 3, sides 142 and 144 are two opposing sides of semiconductor optical amplifier 140. The application of optical signals $B_2$ and D to semiconductor optical amplifier 140 causes a counter-propagating four-wave mixing to occur within semiconductor optical amplifier 140. As a result of this counter-propagating four-wave mixing, semiconductor optical amplifier 140 generates and delivers optical signal E from its side 144 to optical multiplexer 130. Signal E has the same wavelength as signal C generated by continuous-laser 160 and has an amplitude modulation that is same as the amplitude modulation of input signal A received by optical wavelength converter 100. Signal E is applied to optical circulator 150 which subsequently delivers this signal as an output signal, also shown as signal E.

Figure 4:
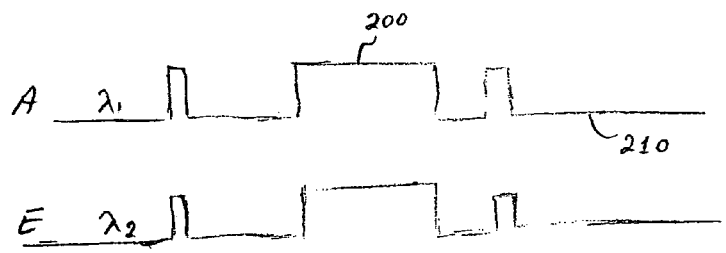
FIG. 4 shows the optical signals received and supplied by the all optical wavelength converter of FIG. 3, in accordance with one embodiment of the present invention.

FIG. 4 shows an example of optical signals A and E that are respectively received and supplied by optical wavelength converter 100. Because signal E is modulated with the amplitude of signal A, both signals have the same waveform, except that signal E is time delayed slightly and has the wavelength of $\lambda_2$ whereas signal A has the wavelength of $\lambda_1$. In other words, signal E is a wavelength converted representation of signal A.

Four-wave mixing of optical signals is well known. See, for example, Hecth, Jeff, "Understanding Fiber Optics", pp. 122-123 (1999). The physical phenomenon occurring in optical semiconductor amplifier 140 is referred to as counter-propagating degenerated four-wave mixing, partly because there are fewer than four applied waves (i.e., optical signals), and partly because signal E, which is generated within semiconductor optical amplifier 140 by signals D and $B_2$, propagates in the direction opposite to the direction of signal D. As described above and in accordance with this phenomenon, when the received optical signal A is at a high optical level, e.g., level 200 in FIG. 4, four-wave mixing occurs within optical semiconductor optical amplifier 140, optical signal E is generated, i.e., has a high level. Conversely, when the received optical signal A is at a low optical level, e.g., level 210 in FIG. 4, no four-wave mixing occurs within optical semiconductor optical amplifier 140, and thus signal E is not generated, i.e., has a low level. Consequently, as seen from FIG. 4, transitions of signal E occur concurrently with transitions of signal A. Signal E has the same amplitude modulation as Signal A, the input signal.

Figure 5:
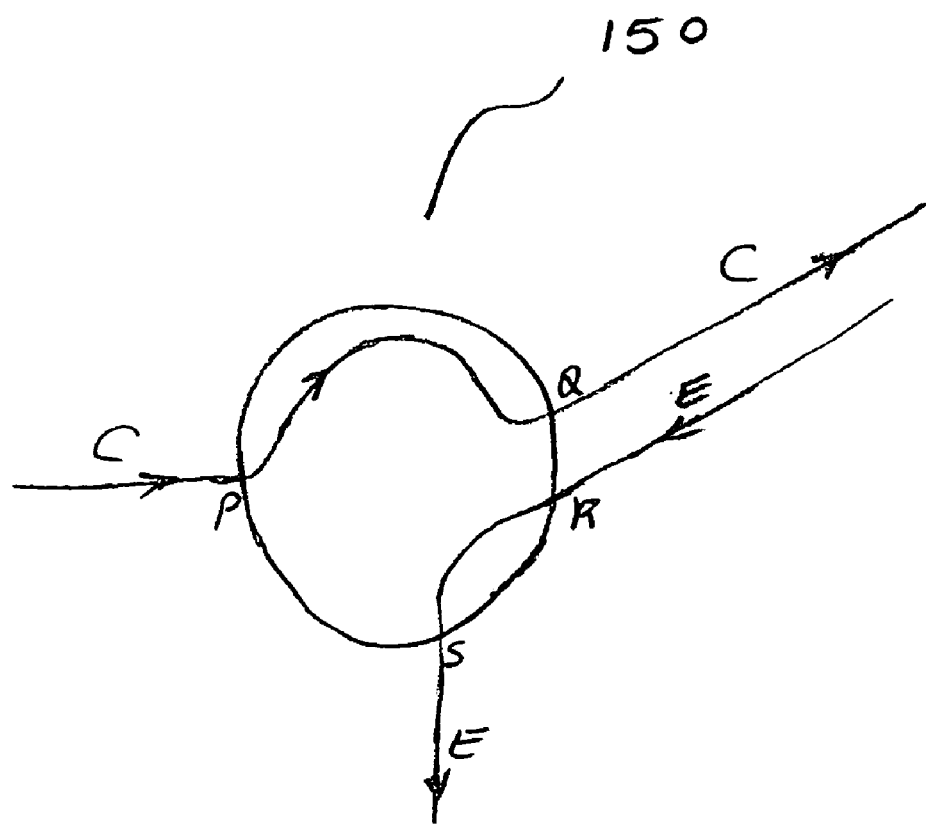
FIG. 5 shows the optical signals passing through the optical circulator of the optical wavelength converter of FIG. 3, in accordance with one embodiment of the present invention.

FIG. 5 shows the optical signals that pass through optical circulator 150. Signal C received from continuous-wave laser 160 is shown as entering optical circulator 150 at point P and exiting it at point Q. Similarly, optical signal E generated within semiconductor optical amplifier 140 and passing through optical multiplexer 130, enters optical circulator at point R and exits it at point S. In some embodiments, optical circulator 150 may be an optical combiner, in which case, the signal power is reduced and some loss of signal-to-noise ratio results.

The optical wavelength converter, in accordance with the present invention, has a relatively high signal-to-noise ratio because it has very high extinction ratio. Moreover, because the optical wavelength converter of the present invention includes integratable optical components, it is potentially smaller less expensive and consumes less power than conventional optical-electrical wavelength converters.

The above embodiments of the present invention are illustrative and not limitative. The invention is not limited by the type of optical amplifier, splitter, optical multiplexer, optical circulator, semiconductor optical amplifier or other components used in specific embodiments of the present invention. Nor is the invention limited by the type of laser used to generate a continuous-wave optical signal. Other additions, subtractions, deletions, and modifications may be made without departing from the scope of the present invention.

What is claimed is:

1. An optical wavelength converter comprising:
   an optical combiner adapted to receive a first optical signal having a first wavelength and a second optical signal having a second wavelength, the optical combiner further adapted to combine the two received optical signals to generate a combined optical signal; and
   a semiconductor optical amplifier adapted to receive a replica of the first optical signal at its first side and the combined optical signal at its second side, said semiconductor optical amplifier further adapted to generate an output optical signal having the second wavelength and having an amplitude modulation that matches an amplitude modulation of the first optical signal,
   wherein the generated output optical signal exits the second side of the semiconductor optical amplifier.

2. The optical wavelength converter of claim 1 further comprising:
   an optical splitter coupled to the semiconductor optical amplifier and adapted to receive a third optical signal having the first wavelength, and to generate the first optical signal and the replica of the first optical signal.

3. The optical wavelength converter of claim 2 further comprising:
   an optical amplifier coupled to the optical splitter and adapted to generate the third optical signal from a fourth optical signal having the first wavelength, wherein said optical amplifier amplifies the fourth optical signal to generate the third optical signal.

4. The optical wavelength converter of claim 3 wherein said optical amplifier is a semiconductor optical amplifier.

5. The optical wavelength converter of claim 3 wherein said optical amplifier is an Erbium-doped fiber amplifier.

6. The optical wavelength converter of claim 3 further comprising:
   an optical circulator adapted to deliver the second optical signal to the optical combiner and further adapted to receive the generated output optical signal having the second wavelength.

7. The optical wavelength converter of claim 6 wherein said optical circulator is an optical combiner.

8. The optical wavelength converter of claim 6 wherein said second optical signal is a continuous-wave optical signal generated by a laser.

9. The optical wavelength converter of claim 1 wherein said optical combiner is an optical multiplexer.

10. The optical wavelength converter of claim 1 wherein the output optical signal has transitions that occur concurrently with transitions of the first optical signal.

11. A method of converting a wavelength of an optical signal, the method comprising:
    receiving a first optical signal having a first wavelength;
    receiving a second optical signal having a second wavelength;
    combining the first and second optical signals to generate a combined optical signal;
    applying a replica of the first optical signal to a first side of a semiconductor optical amplifier;
    applying the combined optical signal to a second side of the semiconductor optical amplifier; and
    generating an output optical signal having the second wavelength and having an amplitude modulation that matches an amplitude modulation of the first optical signal, wherein the generated output optical signal exits the second side of the semiconductor optical amplifier.

12. The method of claim 11 further comprising:
    splitting a third optical signal to generate the first optical signal and the replica of the first optical signal.

13. The method of claim 11 further comprising:
    amplifying a fourth optical signal to generate the third optical signal.

14. The method of claim 13 wherein amplifying the fourth optical signal is performed using a semiconductor optical amplifier.

15. The method of claim 13 wherein amplifying the fourth optical signal is performed using an Erbium-doped fiber amplifier.

16. The method of claim 11 further comprising:
    optically circulating the second optical signal and the generated output optical signal.

17. The method of claim 16 wherein optically circulating the second optical signal and the generated output optical signal is performed using one of an optical circulator and an optical combiner.

18. The method of claim 16 wherein said second optical signal is a continuous-wave optical signal generated by a laser.

19. The method of claim 11 wherein the output optical signal has transitions that occur concurrently with transitions of the first optical signal.

* * * * *